United States Patent
Washiro

(10) Patent No.: US 10,395,222 B2
(45) Date of Patent: Aug. 27, 2019

(54) INFORMATION DISPLAY METHOD, INFORMATION DISPLAY APPARATUS, INFORMATION DISPLAY SYSTEM, AND NON-TRANSITORY COMPUTER READABLE STORAGE MEDIUM

(71) Applicant: Yokogawa Electric Corporation, Tokyo (JP)

(72) Inventor: Mitsuhiro Washiro, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 1160 days.

(21) Appl. No.: 14/695,919

(22) Filed: Apr. 24, 2015

(65) Prior Publication Data

US 2015/0339635 A1    Nov. 26, 2015

(30) Foreign Application Priority Data

May 21, 2014  (JP) ................ 2014-104895

(51) Int. Cl.
| | |
|---|---|
| H04Q 9/00 | (2006.01) |
| G05B 23/02 | (2006.01) |
| G06Q 10/00 | (2012.01) |
| G06T 11/60 | (2006.01) |
| H04L 29/08 | (2006.01) |

(52) U.S. Cl.
CPC ......... *G06Q 10/20* (2013.01); *G05B 23/0216* (2013.01); *G06T 11/60* (2013.01); *H04L 67/12* (2013.01); *H04Q 9/00* (2013.01); *H04Q 2209/00* (2013.01); *H04Q 2209/10* (2013.01); *H04Q 2209/30* (2013.01); *H04Q 2209/40* (2013.01); *H04Q 2209/50* (2013.01)

(58) Field of Classification Search
CPC ......... G06Q 10/20; G06T 11/60; H04L 67/12; H04Q 9/00; H04Q 2209/00; H04Q 2209/10; H04Q 2209/30; H04Q 2209/40; H04Q 2209/50; G05B 2219/25428; G05B 2219/32226; G05B 2219/32235; G05B 2219/33331; G05B 19/418
See application file for complete search history.

(56) References Cited

U.S. PATENT DOCUMENTS

| | | | |
|---|---|---|---|
| 6,965,806 B2* | 11/2005 | Eryurek | G05B 13/0275 700/96 |
| 8,982,156 B2* | 3/2015 | Maggiore | B01D 65/104 345/633 |
| 9,541,905 B2* | 1/2017 | Nixon | G05B 11/01 |
| 2002/0038200 A1 | 3/2002 | Shimizu et al. | |
| 2006/0241907 A1 | 10/2006 | Armstrong et al. | |
| 2007/0043539 A1* | 2/2007 | Niina | G05B 23/0221 702/188 |

FOREIGN PATENT DOCUMENTS

| | | |
|---|---|---|
| JP | 58-169209 A | 10/1983 |
| JP | 2003-333121 A | 11/2003 |
| JP | 2004-234229 A | 8/2004 |
| JP | 2007-58533 A | 3/2007 |

* cited by examiner

*Primary Examiner* — Franklin D Balseca
(74) *Attorney, Agent, or Firm* — Sughrue Mion, PLLC

(57) ABSTRACT

An information display method includes a step of inputting, by an input, a work information for identifying a maintenance work to be conducted in a plant, and a step of displaying, by a display, a set of device-state-related information generated by at least a field device associated with the maintenance work identified by the work information.

20 Claims, 7 Drawing Sheets

FIG. 2

| WORK NAME | TAG | THRESHOLD | MESSAGE |
|---|---|---|---|
| BOILER EXCHANGE WORK | PT1001 | TH11 | TEMPERATURE IN REFRIGERANT TANK EXCEEDS THRESHOLD URGENTLY STOP BOILER AND EVACUATE |
| | | TH12 | |
| | LIC511 | TH21 | |
| | | TH22 | |
| | PTL211 | TH31 | |
| | | TH32 | |
| TANK WASH WORK | ⋮ | ⋮ | ⋮ |
| TANK EXCHANGE WORK | ⋮ | ⋮ | ⋮ |
| REFRIGERANT TANK CHANGE WORK | ⋮ | ⋮ | ⋮ |
| ⋮ | ⋮ | ⋮ | ⋮ |

INFORMATION DISPLAY METHOD, INFORMATION DISPLAY APPARATUS, INFORMATION DISPLAY SYSTEM, AND NON-TRANSITORY COMPUTER READABLE STORAGE MEDIUM

BACKGROUND OF THE INVENTION

Field of the Invention

The disclosure relates to an information display method, an information display apparatus, an information display system, and a non-transitory computer readable storage medium.

Priority is claimed on Japanese Patent Application No. 2014-104895, filed May 21, 2014, the contents of which are incorporated herein by reference.

Description of Related Art

In a plant and a factory (hereinafter called simply "plant" as a generic name of them), a DCS (Distributed Control System) is established, and an advanced automatic operation is implemented. In the distributed control system, field devices (for example, a measurement device, a manipulation device, a display device, an alarm device, and other devices) and a controller controlling the field devices are connected to each other via a network. In the plant in which the distributed control system is established, so as to prevent abnormal operations and keep measurement accuracy, a worker conducts maintenance of the field device periodically or non-periodically.

Recently, so as to efficiently maintain the field devices, an integrated device management system such as a PRM (Plant Resource Manager) (registered trademark) is often established along with the distributed control system. The integrated device management system has a function (maintenance information management function) for managing a maintenance schedule of each field device, a function (maintenance check work function) for monitoring a condition of the each field device and adjusting the each field device, and a function (maintenance check result management function) for recording results of the maintenance check and reporting the results of the maintenance check.

In the Japanese Unexamined Patent Application Publication No. 2003-333121, a field device communication apparatus (field device communication server) used by the integrated device management system is disclosed. The field device communication server performs a semi-synchronization type communication with a controller which controls the field devices, and the field device communication server collects measurement results (process values) of the field devices and diagnostic information such as failure information. In a case where the field device communication server receives a request from a host device (for example, a terminal device which is operated by a plant operator), the field device communication server provides the collected information to the host device.

The maintenance of the plant may not be conducted while the plant is entirely stopped, and the maintenance of the plant may be conducted while only a part of the processes are stopped. For example, there is a case that a chemical material storage tank is checked and exchanged, in a state where chemical reactions in peripheral devices relating to the chemical material storage tank are suppressed by manually closing valves disposed on a pipe line connected to the chemical material storage tank, and the processes are stopped. In a case of conducting the maintenance, along with a maintenance target device (in the example described above, the chemical material storage tank), there is a need to obtain states of the peripheral devices relating to the maintenance target device.

The maintenance of the plant is conducted in accordance with a documented procedure which is preliminarily determined and documented by the plant operator and a field worker. Specifically, the plant operator observes the states of the field devices by operating the integrated device management system, and the plant operator works in accordance with the determined procedure while the plant operator checks information (for example, actual process values and actual device states) by talking with the field worker on a cell-phone. In a case of a field device installed in a position where the field worker can approach, the field worker visually checks contents of a display screen of the field device, or the field worker obtains necessary information by connecting a special-purpose terminal to the field device. On the other hand, in a case of a field device installed in a position where the field worker cannot approach, the field worker asks the plant operator so as to obtain the process values and the states of the field device.

Although the plant operator can check the maintenance target device by using the integrated device management system, in a case where the plant operator does not have sufficient knowledge and experience, it is difficult for the plant operator to check the peripheral devices relating to the maintenance target device. Even if the field worker can identify the peripheral devices relating to the maintenance target device, in a case where the field worker cannot approach the field devices which are disposed in the identified peripheral devices, the field worker cannot visually check the contents of the display screen of the field device, and the field worker cannot obtain the necessary information by connecting the special-purpose terminal to the field device. For the reason, the original works (for example, monitoring the states of the field devices) cannot be efficiently performed.

SUMMARY

An information display method may include inputting, by an input, a work information for identifying a maintenance work to be conducted in a plant, and displaying, by a display, a set of device-state-related information generated by at least a field device associated with the maintenance work identified by the work information.

Further features and aspects of the present disclosure will become apparent from the following detailed description of exemplary embodiments with reference to the attached drawings.

BRIEF DESCRIPTION OF THE DRAWINGS

FIG. 2 is a drawing illustrating an example of master data used in the present embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide an information display method, an information display apparatus, an information display system, and a non-transitory computer readable storage medium which can display the states of the peripheral devices relating to the maintenance target device, and can easily perform the maintenance thereby.

Figure 1:
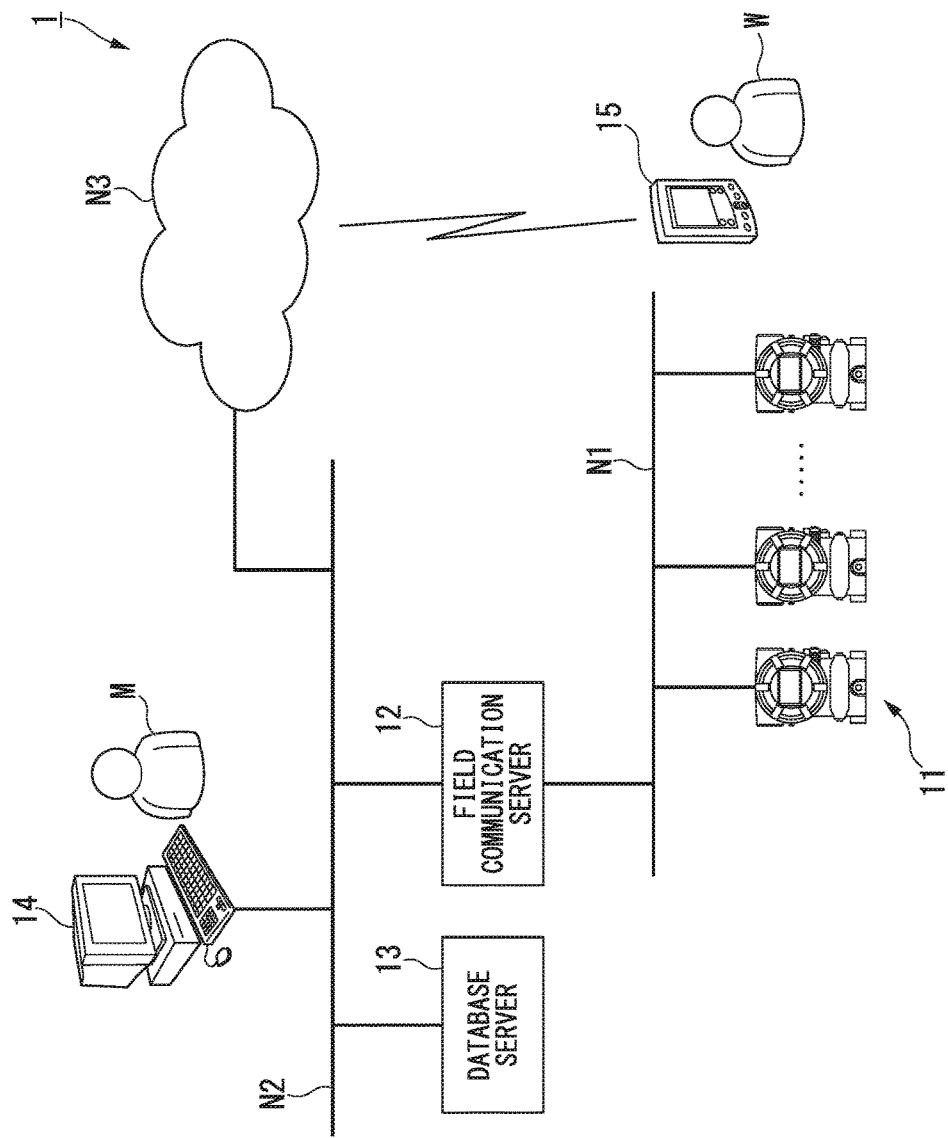
FIG. 1 is a block diagram illustrating an entire configuration of an information display system in a present embodiment.

The information display method, the information display apparatus, the information display system, and the non-transitory computer readable storage medium of the present embodiment will be described below with reference to drawings. FIG. 1 is a block diagram illustrating an entire configuration of the information display system in the present embodiment.

As shown in FIG. 1, the information display system 1 of the present embodiment is equipped with field devices 11, a field communication server 12, a database server 13, an operation monitoring terminal device 14 (second terminal device), and a portable terminal device 15 (first terminal device). The information display system 1 can display a set of device-state-related information generated by the field devices 11 associated with maintenance works.

For example, the information display system 1 is established in a plant and a factory (hereinafter called simply "plant" as a generic name of them). The plant includes an industrial plant such as a chemical industrial plant, a plant managing and controlling a wellhead (for example, a gas field and an oil field), a plant managing and controlling a generation of electric power (for example, water power, fire power, and nuclear power), a plant managing and controlling a power harvesting (for example, solar power and wind power), a plant managing and controlling water supply and sewerage systems, a dam, and so on.

As shown in FIG. 1, a control network N1, an application network N2, and a wireless network N3 are disposed in the information display system 1. For example, the control network N1 is a wired network set in the field of the plant. The field devices 11 and the field communication server 12 are connected to the control network N1. For example, the application network N2 is a wired network set in a monitoring room (operation room) in the plant. The field communication server 12, the database server 13, and the operation monitoring terminal device 14 are connected to the application network N2.

The wireless network N3 is a wireless network set in the field of the plant. The portable terminal device 15 is connected to the wireless network N3. Because the wireless network N3 is connected to the application network N2, the portable terminal device 15 can access to the field communication server 12 and the database server 13, which are connected to the application network N2, via the wireless network N3.

The field devices 11 are such as a sensor device (for example, a flowmeter and a temperature sensor), a valve device (for example, a flow control valve and an on-off valve), an actuator device (for example, a fan and a motor), an imaging device (for example, a camera and a video camera recording circumstances and objects in the plant), a sound device (for example, a microphone collecting abnormal noise in the plant, and a speaker generating alarm sound), a position detection device outputting position information of each device, and other devices.

The field devices 11 are disposed in the field of the plant. All of the each field devices 11 are managed (controlled) by a controller (not shown). The field devices 11 have a self-diagnosis function of diagnosing a self-state. The field devices 11 transmit the device-state-related information to the controller (not shown). The device-state-related information transmitted by the field devices 11 includes information (status) representing a result of the self-diagnosis and information (alarm) representing an abnormality occurred in the field devices 11.

The field communication server 12 performs a communication (for example, a semi-synchronization type communication) with the controller controlling the field devices 11. The field communication server 12 collects measurement results (process values) of the field devices 11 and diagnostic information representing the result of the self-diagnosis of the field devices 11. For example, the field communication server 12 is disposed in the monitoring room in the plant.

The database server 13 receives the device-state-related information generated by the field devices 11 associated with the maintenance works conducted in the plant. The database server 13 stores various types of data which are necessary for displaying the received information on the operation monitoring terminal device 14 and the portable terminal device 15. Specifically, the database server 13 stores master data and the device-state-related information (the process values of the field devices 11 and the diagnostic information of the field devices 11). The master data represents the field devices associated with the maintenance works conducted in the plant. Although details will be described later, the master data is created in accordance with an instruction from the operation monitoring terminal device 14. The device-state-related information (the process values and the diagnostic information) is received from the field communication server 12. For example, the database server 13 is also disposed in the monitoring room in the plant.

FIG. 2 is a drawing illustrating an example of the master data used in the present embodiment. As shown in FIG. 2, in the master data, the "tag", the "threshold", and the "message" are associated with the "work name". The "work name" is a name of the maintenance work to be conducted in the plant. The "work name" is set by a person (in the present embodiment, a plant operator M) operating the operation monitoring terminal device 14.

Although whatever names can be set as the "work name", it is preferable that a person (the field worker W or the plant operator M) referring to the "work name" can easily understand the meaning of the maintenance work. In the example shown in FIG. 2, the "boiler exchange work", the "tank wash work", the "tank exchange work", and the "refrigerant tank change work" are set as the work names.

The "tag" is identification information which is set to the each field device 11 so as to easily identify the field device 11. Because the "tag" is associated with the "work name", the "tag" means information representing the field device 11 associated with the maintenance work to be conducted in the plant. In the example shown in FIG. 2, the work name "boiler exchange work" is associated with the tags "PT1001", "LIC511", and "PTL211".

The "threshold" is a value which is set for determining whether the process value generated by the field device 11 is abnormal or not. In a case of a normal condition, the process value generated by the field device 11 is generally within a certain range. For the reason, an upper threshold and a lower threshold are set as the "threshold". In the example shown in FIG. 2, the upper threshold "TH11" and the lower threshold "TH12" are associated with the field device to which the tag "PT1001" is set.

The "message" is a character string for alerting the field worker W and the plant operator M in a case where the process value generated by field device 11 exceeds the threshold associated with the field device 11. It is preferable that the "message" includes an alert representing a process value exceeding the threshold so as to display a current state, and the "message" includes a procedure which is to be conducted so as to prevent a prospective trouble. In the example shown in FIG. 2, the alert "temperature in refrigerant tank exceeds threshold" and the procedure "urgently stop boiler and evacuate" are associated with the work name "boiler exchange work".

The process values and the diagnostic information which are received from the field communication server 12 are associated with the "work name" included in the master data, and the process values and the diagnostic information are stored in the database server 13. For example, in the example shown in FIG. 2, the tags "PT1001", "LIC511", and "PTL211" are associated with the work name "boiler exchange work". The process values and the diagnostic information generated by the field devices to which these tags are set are associated with time information representing when the process values and the diagnostic information are obtained. The process values and the diagnostic information are also associated with the work name "boiler exchange work". The process values and the diagnostic information are stored in the database server 13.

The operation monitoring terminal device 14 is operated by the plant operator M. The operation monitoring terminal device 14 is a terminal device for monitoring the operation state of the plant. Specifically, the operation monitoring terminal device 14 receives the process values and the diagnostic information of the field device 11 collected by the field communication server 12, and the operation monitoring terminal device 14 displays the operation state of the plant entirely or partially in accordance with an instruction from the plant operator M. The operation monitoring terminal device 14 manages the operation state of the plant by controlling the controller (not shown) in accordance with an instruction from the plant operator M.

The operation monitoring terminal device 14 creates the master data in accordance with an instruction from the plant operator M, or the operation monitoring terminal device 14 displays the set of the device-state-related information generated by the field devices 11 associated with the maintenance work to be conducted in the plant in accordance with the created master data. Although details will be described later, the operation monitoring terminal device 14 can display the same contents as the display contents of the portable terminal device 15 which is used by the field worker W, by identifying an ID (identifier) allocated to the portable terminal device 15 in accordance with an instruction from the plant operator M. The operation monitoring terminal device 14 is implemented as a desktop computer which is equipped with an input (for example, a keyboard and a mouse) and a display (for example, a liquid crystal display device).

The portable terminal device 15 is operated by the field worker W. The portable terminal device 15 is a terminal device used for obtaining the process values and the diagnostic information. The portable terminal device 15 can access to the field communication server 12 and the database server 13 which are connected to the application network N2 via the wireless network N3. For the reason, as is the case with the operation monitoring terminal device 14, in accordance with an instruction from the field worker W, the portable terminal device 15 can display the set of the device-state-related information generated by the field devices 11 associated with the maintenance work to be conducted in the plant in accordance with the master data. The portable terminal device 15 is implemented as a notebook computer which is equipped with an input (for example, a keyboard and a mouse) and a display device (for example, a liquid crystal display device), a tablet computer which is equipped with a touch panel, a PDA (Personal Digital Assistant), or the like.

A CPU (Central Processing Unit) disposed in a computer runs one or more programs for implementing the functions (a master data creating function and a display function in accordance with the master data) of the operation monitoring terminal device 14 and the function (a display function in accordance with the master data) of the portable terminal device 15. Therefore, software and hardware resources cooperate with each other so that the functions of the operation monitoring terminal device 14 and the portable terminal device 15 can be implemented.

The one or more programs for implementing the functions may be stored in a non-transitory computer readable storage medium such as a CD-ROM or DVD (registered trademark)-ROM, and the storage medium may be distributed. Also, the one or more programs may be distributed via an external network such as the Internet. The functions may be implemented as software by reading the one or more programs out of the storage medium and installing the one or more programs in the computer. Also, the functions may be implemented as software by downloading the one or more programs via the external network and installing the one or more programs in the computer.

Figure 3:
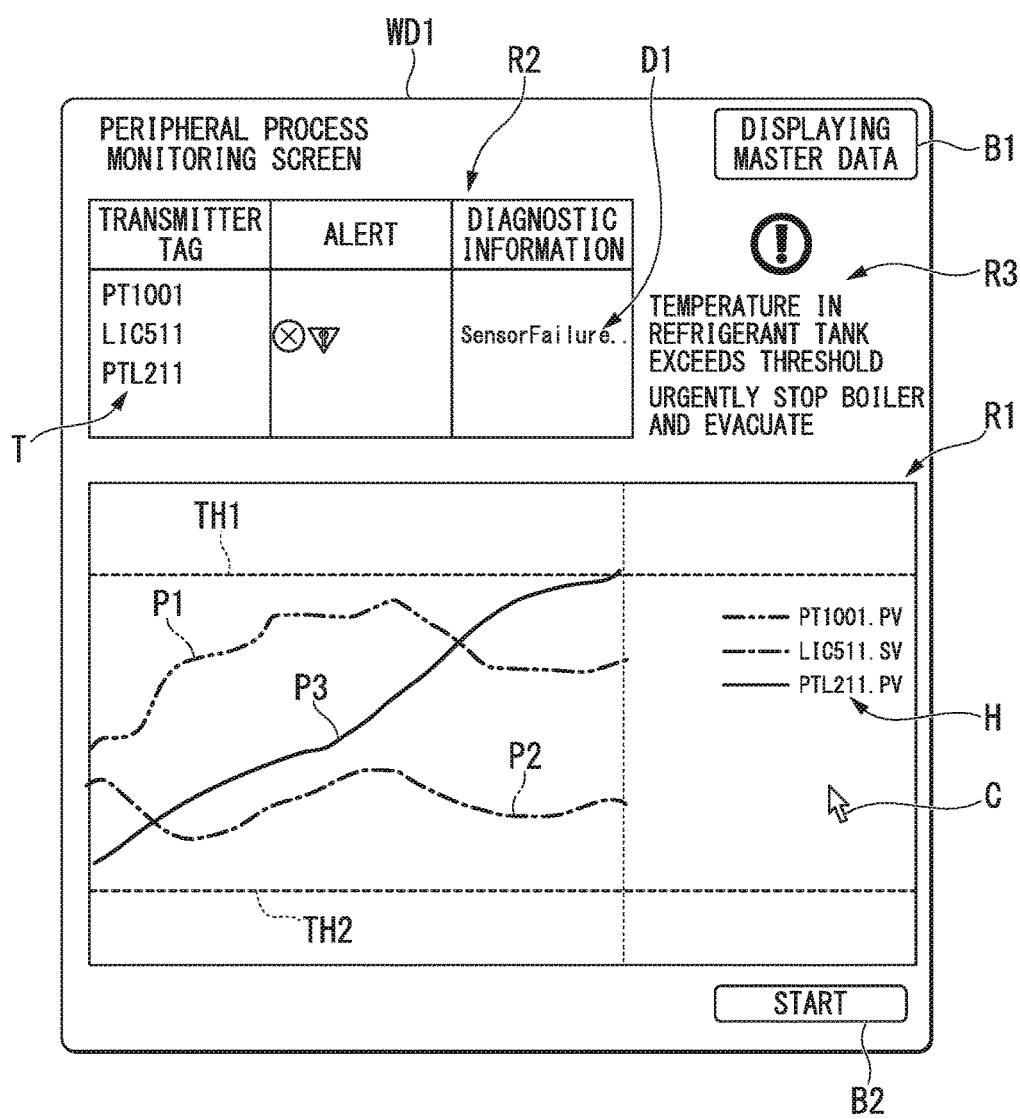
FIG. 3 is a drawing illustrating an example of a display screen of an operation monitoring terminal device and a portable terminal device in the present embodiment.

Next, the display screen of the operation monitoring terminal device 14 which is operated by the plant operator M and the display screen of the portable terminal device 15 which is operated by the field worker W will be described below. FIG. 3 is a drawing illustrating an example of the display screen of the operation monitoring terminal device and the portable terminal device in the present embodiment. In accordance with instructions from the plant operator M and the field worker W, a peripheral process monitoring screen WD1 shown in FIG. 3 is displayed on the operation monitoring terminal device 14 and the portable terminal device 15 respectively. The peripheral process monitoring screen WD1 is a screen which can display the set of the device-state-related information generated by the field devices 11 associated with the maintenance work to be conducted in the plant.

In a case where a work name of the master data instructed by the plant operator M is the same as a work name of the master data instructed by the field worker W, contents of the peripheral process monitoring screen WD1 displayed on the operation monitoring terminal device 14 is the same as contents of the peripheral process monitoring screen WD1 displayed on the portable terminal device 15. On the other hand, in a case where the work name instructed by the plant operator M is different from the work name instructed by the field worker W, contents of the peripheral process monitoring screen WD1 displayed on the operation monitoring terminal device 14 is different from contents of the peripheral process monitoring screen WD1 displayed on the portable terminal device 15.

As shown in FIG. 3, the peripheral process monitoring screen WD1 includes a process value display area R1, a diagnostic information display area R2, a message display area R3, a master data display button B1, and a start button B2. The process value display area R1 is an area where the process values P1 to P3 (first information), which are generated by the field devices 11 associated with the maintenance works conducted in the plant, are displayed along with the legends H. In other words, the process values P1 to P3 generated by the field devices 11 are displayed with the process values P1 to P3 associated with the legends H for identifying the field devices 11.

In the process value display area R1, one of the thresholds which are preliminarily set to the process values P1 to P3 is displayed. In the example shown in FIG. 3, the upper threshold TH1 and the lower threshold TH2 are displayed in the process value display area R1. As the upper threshold TH1 and the lower threshold TH2, thresholds set to the process value P1, thresholds set to the process value P2, and thresholds set to the process value P3 can be displayed by selecting one of the process values P1 to P3 displayed in the process value display area R1.

The diagnostic information display area R2 is an area where the diagnostic information D1 (second information), which is generated by the field devices 11 associated with the maintenance works conducted in the plant, is displayed along with the tags T. In other words, the diagnostic information D1 generated by the field devices 11 is displayed along with the tags T for identifying the field devices 11. In the example shown in FIG. 3, the diagnostic information D1 is displayed along with icons indicating contents of the diagnostic information D1, so that the plant operator M and the field worker W can intuitively understand the diagnostic information D1.

The message display area R3 is an area where the message shown in FIG. 2 is displayed. In a case where any one of the process value P1 to P3 generated by the field device 11 exceeds the threshold associated with the field device 11, the message is displayed in the message display area R3 so as to alert the field worker W and the plant operator M. In the example shown in FIG. 3, the messages including the alert "temperature in refrigerant tank exceeds threshold" and the procedure "urgently stop boiler and evacuate" are displayed. In the example shown in FIG. 3, the messages are displayed along with an alert icon (a mark in which an exclamation mark is in a circle).

The master data display button B1 is a button for reading the master data out of the database server 13 and displaying the master data. By clicking the master data display button B1 by using a cursor C, the list L1 (shown in FIG. 4) of the "work name" included in the master data is displayed. After selecting any one of "work name" from the list and clicking the start button B2, the display contents of the peripheral process monitoring screen WD1 can be changed. The start button 132 is a button for starting displaying with respect to the peripheral process monitoring screen WD1, or for changing the display contents of the peripheral process monitoring screen WD1.

Although details will be described later, the operation monitoring terminal device 14 can start a program for displaying the peripheral process monitoring screen WD1 in a "data creating mode" or a "monitoring mode". The "data creating mode" is a mode for creating the master data by setting the process values and the thresholds which are to be displayed on the peripheral process monitoring screen WD1. On the other hand, the "monitoring mode" is a mode for referring to the process values and the thresholds by using the created master data. The portable terminal device 15 can start a program for displaying the peripheral process monitoring screen WD1 in the "monitoring mode", but the portable terminal device 15 cannot start the program in the "data creating mode".

Next, operations of the information display system 1 will be described below. So as to easily understand, first, an operation of creating the master data (master data creating operation) will be described. Thereafter, an operation of displaying the set of the device-state-related information generated by the field devices 11 when the maintenance work is conducted (information display operation) will be described.

<Master Data Creating Operation>

Figure 4:
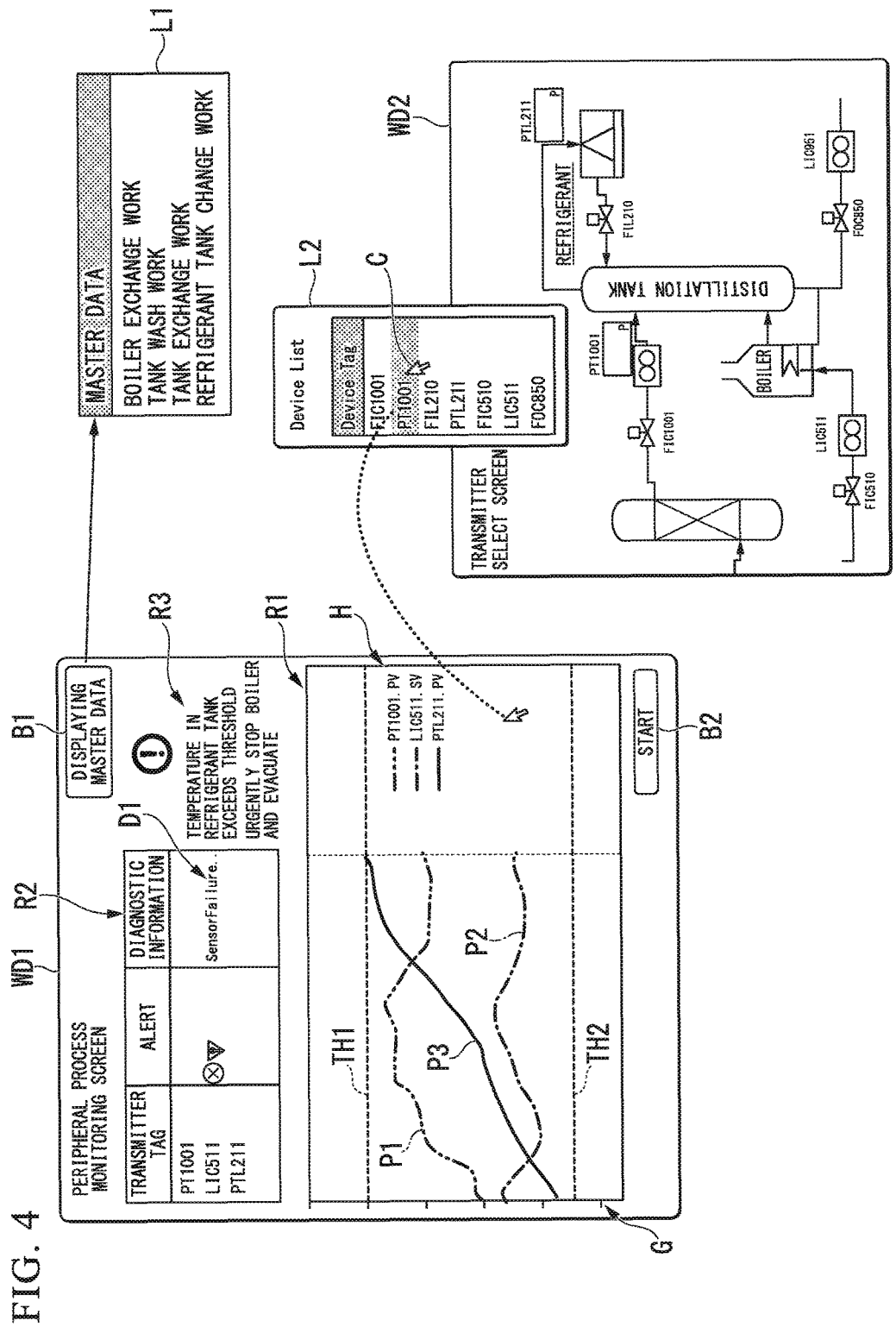
FIG. 4 is a drawing illustrating an example of display contents of the operation monitoring terminal device when the master data is created.

In a case of creating the master data, first, the plant operator M operates the operation monitoring terminal device 14 so as to start the program for displaying the peripheral process monitoring screen WD1 in a "data creating mode". Also, the plant operator M operates the operation monitoring terminal device 14 so as to display a transmitter select screen WD2 for selecting one of the field devices 11 on the operation monitoring terminal device 14. By these operations, as shown in FIG. 4, the peripheral process monitoring screen WD1 and the transmitter select screen WD2 are displayed on the operation monitoring terminal device 14. FIG. 4 is a drawing illustrating an example of the display contents of the operation monitoring terminal device when the master data is created.

As shown in FIG. 4, so as to easily select the field devices 11, the plant operator M operates the operation monitoring terminal device 14 to display the device to which the maintenance work is conducted (the maintenance target device), the peripheral devices relating to the maintenance target device, and the field devices 11 disposed in the maintenance target device and the peripheral devices, on the transmitter select screen WD2. The transmitter select screen WD2 is created by using plant information (information representing positions and connection relations of various types of devices and the field devices 11 which are disposed in the plant) which is preliminarily stored in the database server 13. In the example shown in FIG. 4, for example, the maintenance target device is the "boiler", and the peripheral devices are the "distillation tank" and the "refrigerant tank".

Figure 5:
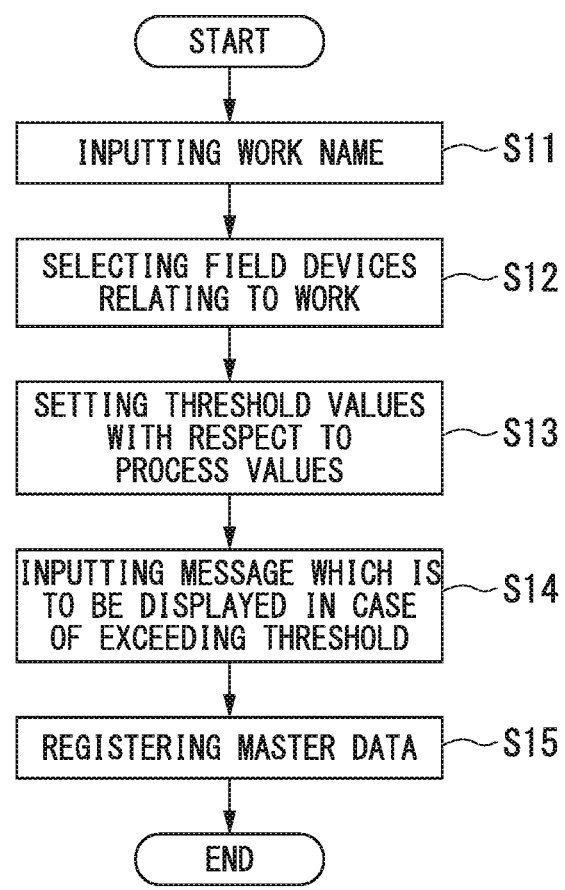
FIG. 5 is a flowchart illustrating a creation process of the master data in the present embodiment.

As shown in FIG. 4, the operation monitoring terminal device 14 starts creating the master data while the operation monitoring terminal device 14 displays the peripheral process monitoring screen WD1 and the transmitter select screen WD2. FIG. 5 is a flowchart illustrating a creation process of the master data in the present embodiment. When the creation process of the master data is started, the operation monitoring terminal device 14 inputs the work name of the maintenance work to be conducted in the plant, in accordance with operations of the plant operator M (step S11). So as to easily understand, for example, the work name "boiler exchange work" is input.

Next, the operation monitoring terminal device 14 selects the field devices 11 associated with the maintenance work in accordance with operations of the plant operator M (step S12). Specifically, as shown in FIG. 4, the plant operator M selects one of the tags included in the device list L2 (a list of the tags of the field devices 11 displayed in the transmitter select screen WD2) by using the cursor C. The plant operator M drags and drops the selected tag to the peripheral process monitoring screen WD1. The operation monitoring terminal device 14 selects the field device 11 corresponding to the tag dragged and dropped by the plant operator M. In FIG. 4, the field device 11 to which the tag "PT1001" is set is dragged and dropped.

The process of selecting the field device 11 is performed more than once in accordance with operations of the plant operator M. Specifically, the process of selecting the field device 11 is performed as often as a number of the field devices 11 to which the plant operator M intends to relate the maintenance work "boiler exchange work". In the example shown in FIG. 4, three field devices 11 to which the tags "PT1001", "LIC511", and "PTL211" are set respectively are selected. When the field devices 11 are selected, the process values P1 to P3 generated by the selected field devices 11 are displayed in the process value display area R1 in the peripheral process monitoring screen WD1, and the diagnostic information D1 generated by the selected field devices 11 is displayed in the diagnostic information display area R2 in the peripheral process monitoring screen WD1.

Thereafter, the operation monitoring terminal device 14 sets the thresholds with respect to the process values P1 to P3 generated by the selected field devices 11 (step S13). Specifically, the plant operator M selects the process values P1 to P3 or the legends H which are displayed in the process value display area R1 in the peripheral process monitoring screen WD1 by using the cursor C. The plant operator M inputs the upper threshold TH11 and the lower threshold TH12 of the selected process values P1 to P3. The operation monitoring terminal device 14 sets the upper threshold TH11 and the lower threshold TH12 input by the plant operator M with respect to the process values P1 to P3. A scale G is automatically displayed in accordance with magnitude of the process values P1 to P3 displayed in the process value display area R1. The plant operator M inputs the upper threshold TH11 and the lower threshold TH12 with reference to the scale G.

Next, the operation monitoring terminal device 14 inputs the message, which is to be displayed in the peripheral process monitoring screen WD1 in a case where at least one of the process values P1 to P3 of the selected field device 11 exceeds the threshold (step S14). For example, the plant operator M selects the message display area R3 in the peripheral process monitoring screen WD1, and the plant operator M inputs the message in the selected message display area R3. The operation monitoring terminal device 14 receives the message input by the plant operator M.

After these processes are completed, when the plant operator M closes the peripheral process monitoring screen WD1 displayed on the operation monitoring terminal device 14, a confirmation screen for confirming an update of the master data is displayed. In a case where the plant operator M instructs the update of the master data, the operation monitoring terminal device 14 creates the master data, and the operation monitoring terminal device 14 registers the created master data with the database server 13 (step S15). Specifically, the operation monitoring terminal device 14 created the master data in which the "tag" of the field device 11 selected in the step S 12, the "threshold" set in the step S13, and the "message" input in the step S14 are related with respect to the "work name" input in the step S11, and the operation monitoring terminal device 14 stores the created master data in the database server 13.

In a case where the database server 13 has already registered the master data, by clicking the master data display button B1 in the peripheral process monitoring screen WD1, the list L1 of the "work name" included in the master data is displayed. After one of the "work name" in the list L1 is selected by using the cursor C, the "tag", the "threshold", and the "message" which are associated with the selected "work name" can be edited.

<Information Display Operation>

When the maintenance work is conducted in the plant, in a case where the set of the device-state-related information generated by the field devices 11 associated with the maintenance work is displayed, the operation monitoring terminal device 14 starts the program for displaying the peripheral process monitoring screen WD1 in the "monitoring mode" in accordance with operations of the plant operator M, or the portable terminal device 15 starts the program for displaying the peripheral process monitoring screen WD1 in the "monitoring mode" in accordance with operations of the field worker W. So as to describe simply, an example of displaying the set of the device-state-related information on the portable terminal device 15 which is operated by the field worker W will be described below.

Figure 6:
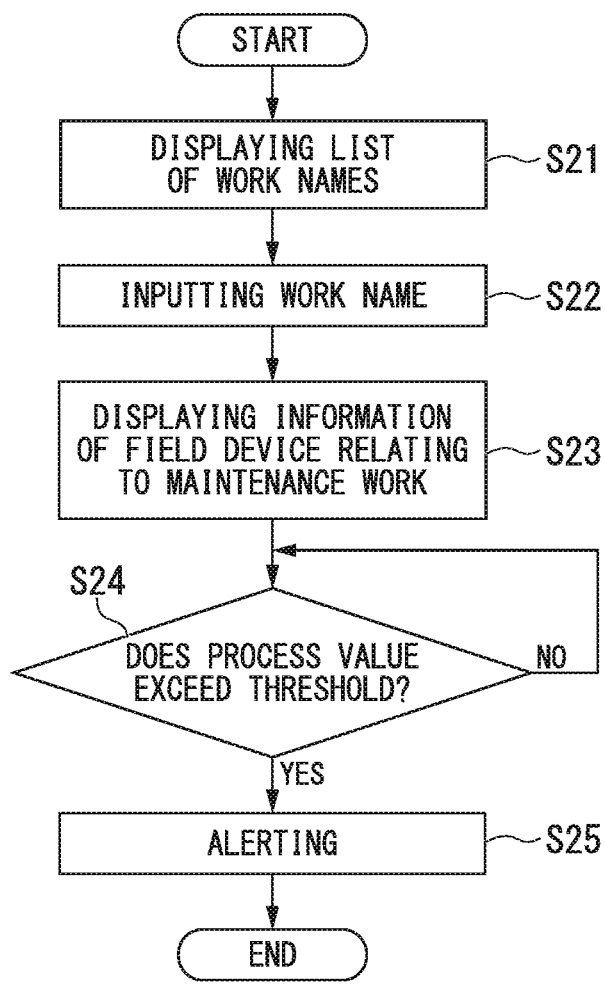
FIG. 6 is a flowchart illustrating a display process of the device-state-related information in the present embodiment.

When the program is started, the portable terminal device 15 which is operated by the field worker W displays the peripheral process monitoring screen WD1. However, at this time, nothing is displayed in the process value display area R1, the diagnostic information display area R2, and the message display area R3 in the peripheral process monitoring screen WD1. After such peripheral process monitoring screen WD1 is displayed, processes of the flowchart shown in FIG. 6 are executed. FIG. 6 is a flowchart illustrating a display process of the device-state-related information in the present embodiment.

First, when the field worker W clicks the master data display button B1 in the peripheral process monitoring screen WD1 by using the cursor C, the master data stored in the database server 13 is read out of the database server 13. The portable terminal device 15 displays the list L1 (shown in FIG. 4) of the "work name" included in the master data (step S21).

While the list L1 is displayed, when the field worker W selects one of the work names included in the list L1 by using the cursor C and clicks the start button B2, the selected work name (work information) is input to the portable terminal device 15 (step S22). Thereafter, the "tag", the "threshold", and the "message" which are associated with the input work name are read from the master data, and the process values and the diagnostic information which are associated with the input work name are read out of the database server 13. In other words, the portable terminal device 15 identifies the field devices that are associated with the maintenance work in accordance with the master data, and the portable terminal device 15 identifies the set of the device-state-related information which is generated by the field devices.

The portable terminal device 15 displays, for example, the peripheral process monitoring screen WD1 shown in FIG. 3 in accordance with the process values and the diagnostic information (the set of the device-state-related information) read out of the database server 13 (step S23). In a case where the "boiler exchange work" is selected from the list L1, as shown in FIG. 3, the process values P1 to P3, which are generated by the field devices 11 to which the tags "PT1001", "LIC511", and "PTL211" are set, are displayed in the process value display area R1 along with the legends H. Also, the diagnostic information D1 generated by the field devices 11 is displayed in the diagnostic information display area R2 with the diagnostic information D1 associated with the tag T.

With reference to the peripheral process monitoring screen WD1, the field worker W can understand how many peripheral devices and field devices 11 relate to the maintenance work to be conducted in the plant. Also, in accordance with the set of the device-state-related information (the process values P1 to P3 and the diagnostic information D1) generated by the field devices 11 associated with the maintenance work to be conducted in the plant, the field worker W can understand the states of the peripheral devices in which the field devices 11 are disposed.

While the peripheral process monitoring screen WD1 shown in FIG. 3 is displayed, the portable terminal device 15 determines whether at least one of the process values P1 to P3 displayed in the process value display area R1 exceeds the associated threshold or not (step S24). In a case where the portable terminal device 15 determines that at least one of the process values P1 to P3 exceeds the associated threshold (step S24: YES), the portable terminal device 15 alerts (step S25).

For example, as shown in FIG. 3, the messages including the alert "temperature in refrigerant tank exceeds threshold" and the procedure "urgently stop boiler and evacuate" are displayed in the message display area R3 in the peripheral process monitoring screen WD1. Because the field worker W's hands are often full for the work, sound (buzzer) and vibration may be used along with the message as the alert. Information representing a type of the alert and importance of the alert may be set to the master data along with the message. In a case of generating the alert, patterns of the sound and the vibration may be changed in accordance with the type of the alert and the importance of the alert.

Figure 7:
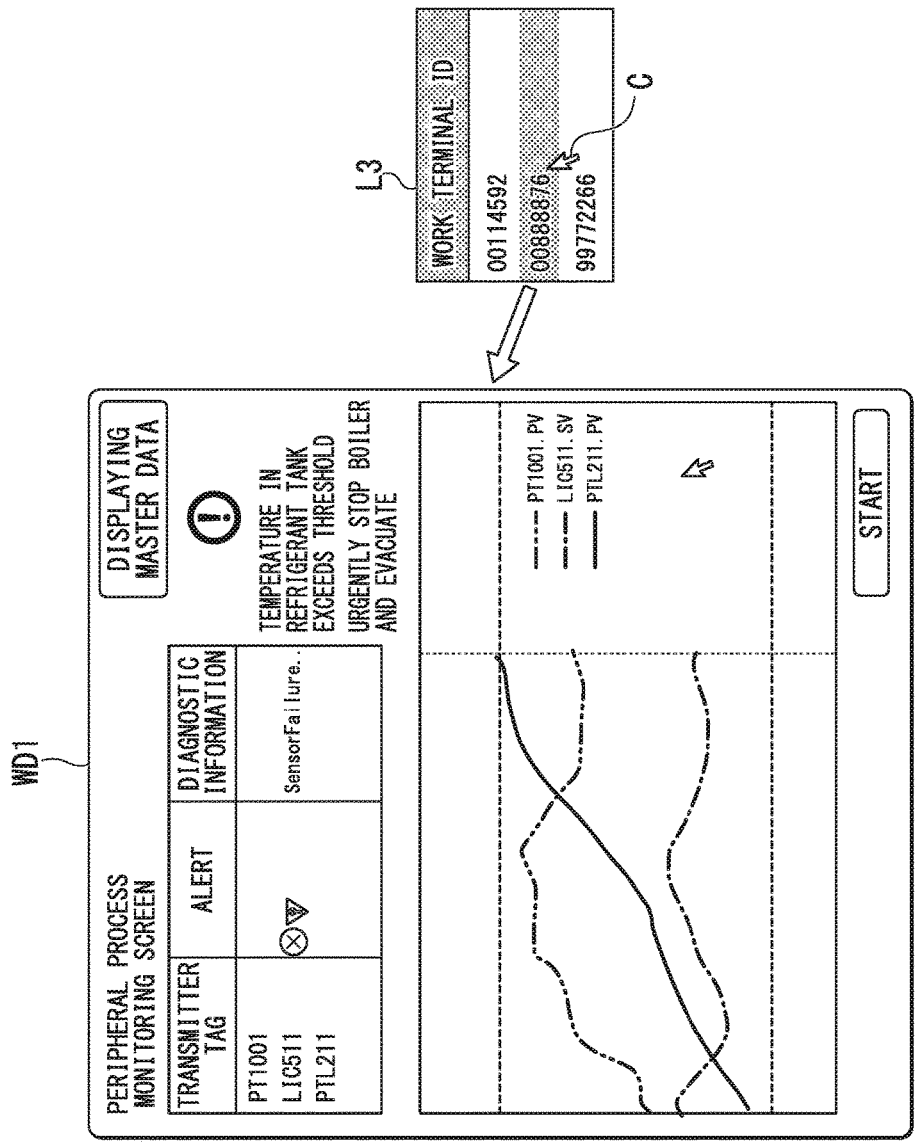
FIG. 7 is a drawing illustrating an example of a terminal list displayed on the operation monitoring terminal device in the present embodiment.

While the field worker W uses the portable terminal device 15 for working, in a case where the plant operator M instructs the operation monitoring terminal device 14 to display a list of the portable terminal devices 15, the operation monitoring terminal device 14 displays a terminal list L3 shown in FIG. 7. FIG. 7 is a drawing illustrating an example of the terminal list displayed on the operation monitoring terminal device in the present embodiment. As shown in FIG. 1, the operation monitoring terminal device 14 and the portable terminal devices 15 can communicate with each other via the application network N2 and the wireless network N3. For the reason, the operation monitoring terminal device 14 can recognize the portable terminal devices 15 connected to the wireless network N3, and the operation monitoring terminal device 14 can display the terminal list L3 shown in FIG. 7.

When the plant operator M selects the ID (for example, the ID "00888876") displayed in the terminal list L3 by using the cursor C shown in FIG. 7, the operation monitoring terminal device 14 displays the peripheral process monitoring screen WD1 which is the same as the peripheral process monitoring screen WD1 displayed on the portable terminal device 15 which is associated with the selected ID. While the operation monitoring terminal device 14 displays the peripheral process monitoring screen WD1, in a case where the alert is generated from the portable terminal device 15 which is associated with the selected ID, the same alert (for example, message, sound, and vibration) is generated from the operation monitoring terminal device 14.

As described above, in the present embodiment, the master data indicating the field devices associated with the maintenance works conducted in the plant is stored in the database server 13, in a case where the work name used for identifying the maintenance work to be conducted in the plant is input, the process values P1 to P3 and the diagnostic information D1 which are generated by the field devices 11 associated with the maintenance work identified by the input work name are displayed in accordance with the master data. For the reason, even if the plant operator M does not have sufficient knowledge and experience, the plant operator M can display the states of the peripheral devices relating to the maintenance target device. Therefore, the maintenance work can be easily conducted.

In the present embodiment, the upper threshold TH1 and the lower threshold TH2 are displayed along with the process values P1 to P3. Therefore, even if the plant operator M does not have sufficient knowledge and experience, the plant operator M can immediately determine whether the states of the peripheral devices are within a normal range or not. Further, in the present embodiment, in a case where at least one of the process values P1 to P3 exceeds the thresholds (the upper threshold TH1 and the lower threshold TH2), the message is displayed. Therefore, in a case where an abnormality occurs, the field worker W can immediately perform a danger avoidance action.

In the present embodiment, because the operation monitoring terminal device 14 can display the same contents as the display contents of the portable terminal device 15 which is operated by the field worker W, the plant operator M can find an abnormality of the field, and the plant operator M can immediately perform the danger avoidance action. Because the plant operator M can easily understand the conditions such as the abnormality of the field with reference to the display contents of the operation monitoring terminal device 14, a cumbersome work, in which the field worker W explains the conditions of the field to the plant operator M by using a cell-phone, can be omitted (or suppressed).

Although an information display method, an information display apparatus, an information display system, and a non-transitory computer readable storage medium according to the embodiments of the present invention have been described above, the present invention is not restricted to the above-described embodiments, and can be freely modified within the scope thereof. For example, the application network N2 and the wireless network N3 may be connected to each other via the Internet. In this case, even if the monitoring rooms and the fields in the plant exist over a range of several kilometers, the present embodiment can be implemented.

In the present embodiment, it is described that, in a case where at least one of the process values P1 to P3 exceeds the threshold, the sound and the vibration are generated along with the message as the alert. However, in a case where the portable terminal device 15 is a compact terminal, only the sound and the vibration may be generated without the message.

In the present embodiment, it is described that the field communication server 12, the database server 13, and the operation monitoring terminal device 14 are connected to each other via the application network N2. However, the field communication server 12, the database server 13, and the operation monitoring terminal device 14 may be integral with each other.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

In the present embodiment, although the maintenance work conducted in the plant is associated with three field devices 11, the present invention is not restricted to the number. For example, at least one of the field devices 11 may be associated with the maintenance work.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An information display method comprising: inputting, using an input device, a work information for identifying a maintenance work to be conducted in a plant;
    identifying, by a processor using master data, a maintenance target device which is a target of the maintenance work and a peripheral device which relates to the maintenance target device based on the work information which has been input by the input device; and
    displaying, by a display, a set of device-state-related information generated by a field device disposed in the maintenance target device identified by the processor, and a set of device-state-related information generated by a field device disposed in the peripheral device identified by the processor.

2. The information display method according to claim 1, further comprising:
    displaying at least one of a first information and a second information along with a device identification information, the first information representing a measurement result generated by the field device of the maintenance target device, the second information representing a diagnostic result generated by the field device of the maintenance target device, and the at least one of the first information and the second information being associated with the device identification information.

3. The information display method according to claim 2, further comprising:
    displaying the first information along with a threshold for the first information.

4. The information display method according to claim 3, further comprising:
    generating an alert, on the display, in a case where a value represented by the first information exceeds the threshold for the first information.

5. The information display method according to claim 4, wherein the generating step comprises a step of displaying an alert for representing that the first information exceeds the threshold, and a procedure with respect to the alert.

6. The information display method according to claim 5, further comprising:
    generating at least one of sound and vibration along with the displayed alert.

7. An information display apparatus comprising:
    an input device configured to receive input about a work information for identifying a maintenance work to be conducted in a plant;
    a processor configured to identify, using master data, a maintenance target device which is a target of the maintenance work and a peripheral device which relates to the maintenance target device based on the work information received by the input device; and
    a display configured to display a set of a device-state-related information generated by a field device disposed in the maintenance target device identified by the processor, and a set of device-state-related information generated by a field device disposed in the peripheral device identified by the processor.

8. The information display apparatus according to claim 7, wherein the display is configured to display at least one of a first information and a second information along with a device identification information, the first information representing a measurement result generated by the field device of the maintenance target device, the second information representing a diagnostic result generated by the field device of the maintenance target device, and the at least one of the first information and the second information being associated with the device identification information.

9. The information display apparatus according to claim 8, wherein the display is configured to display the first information along with a threshold for the first information.

10. The information display apparatus according to claim 9, wherein the display is configured to generate an alert in a case where the first information exceeds the threshold for the first information.

11. The information display apparatus according to claim 10, wherein the display is configured to display an alert for representing that the first information exceeds the threshold, and a procedure with respect to the alert.

12. The information display apparatus according to claim 11, wherein the display is configured to generate at least one of sound and vibration along with the displayed alert.

13. An information display system comprising:
    a server configured to store master data representing field devices associated with each maintenance work to be conducted in a plant; and
    a first terminal device which comprises an information display apparatus, the first terminal device being connected to the server via a network,
    wherein the information display apparatus comprises:
        an input device configured to receive input about a work information for identifying a maintenance work to be conducted in the plant;
        a processor configured to identify, using master data, a maintenance target device which is a target of the maintenance work and a peripheral device which relates to the maintenance target device based on the work information received by the input device; and
        a display configured to display a set of a device-state-related information generated by a field device disposed in the maintenance target device identified by the processor, and a set of device-state-related information generated by a field device disposed in the peripheral device identified by the processor.

14. The information display system according to claim 13, further comprising:
a second terminal device connected to the server via a network, the second terminal device being configured to display same contents as the display contents of the first terminal device by identifying an identifier of the first terminal device.

15. The information display system according to claim 13, wherein the first terminal device is configured to display at least one of a first information and a second information along with a device identification information, the first information representing a measurement result generated by the field device of the maintenance target device, the second information representing a diagnostic result generated by the field device of the maintenance target device, and the at least one of the first information and the second information being associated with the device identification information.

16. The information display system according to claim 15, wherein the first terminal device is configured to display the first information along with a threshold for the first information.

17. The information display system according to claim 16, wherein the first terminal device is configured to generate an alert in a case where the first information exceeds the threshold for the first information.

18. The information display system according to claim 17, wherein the first terminal device is configured to display an alert for representing that the first information exceeds the threshold, and a procedure with respect to the alert.

19. The information display system according to claim 18, wherein the first terminal device is configured to generate at least one of sound and vibration along with the displayed alert.

20. A non-transitory computer readable storage medium storing one or more programs configured for execution by a computer, the one or more programs comprising codes for:
identifying, by a processor using master data, a maintenance target device which is a target of a maintenance work to be conducted in a plant and a peripheral device which relates to the maintenance target device based on a work information for identifying the maintenance work; and
identifying a set of device-state-related information generated by a field device disposed in the maintenance target device identified by the processor, and a set of device-state-related information generated by a field device disposed in the peripheral device identified by the processor.

* * * * *